United States Patent [19]
Clear

[11] Patent Number: 5,968,339
[45] Date of Patent: Oct. 19, 1999

[54] CATHODIC PROTECTION SYSTEM FOR REINFORCED CONCRETE

[76] Inventor: Kenneth C. Clear, 6407 Sperryville Pike, Boston, Va. 22713

[21] Appl. No.: 08/925,010

[22] Filed: Aug. 28, 1997

[51] Int. Cl.⁶ .................................................. C23F 13/00
[52] U.S. Cl. ................ 205/730; 204/196.1; 204/196.21; 204/196.23; 204/196.24; 204/196.25; 204/196.36; 205/732; 205/733; 205/734
[58] Field of Search .................................... 204/196, 197, 204/196.01, 196.07, 196.21, 196.23, 196.24, 196.25, 196.36; 205/724, 730–734

[56] References Cited

U.S. PATENT DOCUMENTS

| | | | |
|---|---|---|---|
| 2,193,667 | 3/1940 | Bary | 204/196 |
| 2,743,227 | 4/1956 | Waite et al. | 204/197 |
| 3,414,496 | 12/1968 | Sudbury et al. | 204/196 |
| 4,506,485 | 3/1985 | Apostolos | 205/734 |
| 4,692,066 | 9/1987 | Clear | 204/196.3 |
| 4,874,487 | 10/1989 | Reed et al. | 204/196 |
| 5,141,607 | 8/1992 | Swiat | 205/734 |
| 5,174,871 | 12/1992 | Russell | 205/734 |
| 5,183,694 | 2/1993 | Webb | 205/734 |
| 5,254,228 | 10/1993 | Westhof et al. | 205/734 |
| 5,292,411 | 3/1994 | Bartholomew et al. | 204/279 |
| 5,296,120 | 3/1994 | Bennett et al. | 205/734 |
| 5,364,511 | 11/1994 | Moreland et al. | 204/196.3 |
| 5,366,670 | 11/1994 | Giner et al. | 264/35 |
| 5,505,826 | 4/1996 | Haglin et al. | 205/731 |
| 5,650,060 | 7/1997 | Huang et al. | 205/734 |
| 5,714,045 | 2/1998 | Lasa et al. | 205/734 |

*Primary Examiner*—T. Tung
*Attorney, Agent, or Firm*—Tarolli, Sundheim, Covell, Tummino & Szabo

[57] ABSTRACT

The present invention resides in a method for cathodic protection of and/or chloride removal from a reinforced concrete structure. The method comprises the steps of: providing an anode comprising a conductive corrodible metal; providing a corrosive environment for said anode; electrically connecting the anode and the reinforcement of the concrete structure; distributing the current flow from the anode across a surface of the concrete structure; and positioning a humectant at said surface in an effective amount to increase the current flow from the anode. The present invention can also be used to migrate lithium into concrete, thus mitigating alkali-aggregate deterioration.

34 Claims, 4 Drawing Sheets

CATHODIC PROTECTION SYSTEM FOR REINFORCED CONCRETE

BACKGROUND OF THE INVENTION

1. Technical Field

This invention relates to the field of cathodic protection for reinforced concrete. The present invention is particularly applicable to a sacrificial cathodic protection system.

2. Description of the Prior Art

Cathodic protection is a proven means of stopping the corrosion of steel in waters, soils and moist, salty reinforced and prestressed concrete structures both above and below water and soil.

Work on adapting sacrificial anodes to reinforced and prestressed concrete structures began in the mid-1970's. Although such anodes could be made to work, problems with low power output and accommodation of the anode corrosion products prevented widespread use of the sacrificial anode technology.

The alternative to a sacrificial anode system is an impressed current cathodic protection system in which power from an outside source is used in concert with low corrosion rate anodes. This alternative does overcome the difficulties of low power output and accommodation of anode corrosion products. Many impressed current systems have been installed. However, they are costly and complicated.

Present sacrificial anode systems will work in hot, moist environments, such as the Florida Keys and similar coastal areas. However, they are too low power for above-water and soil concrete structures in the central and northern portions of the United States. They are also too low power to halt corrosion on structures in hot, moist climates wherein the steel is corroding at a high rate.

The causes of low power output are a low voltage or potential difference between the sacrificial anode and the corroding steel in salty concrete, generally less than one volt, and oftentimes less than 0.6 volts. In addition, concrete, even when wet, has a higher resistivity (resistance per unit area) than most wet soils and natural waters, up to 100,000 or more ohms-cm, which creates a circuit resistance of hundreds or thousands of ohms. Dividing the voltage, e.g., 0.6 to one volt, by the resistance, e.g., hundreds or thousands of ohms, resulting in a low current output.

Temperature greatly affects concrete resistivity. The lower the temperature, the higher the resistivity and thus the lower the current output.

The resistance is increased if the concrete layer immediately beneath the sacrificial anode dries out.

Additionally, sacrificial systems have the shortcoming of a finite life which often is less than the life of the structure involved. If the sacrificial systems are embedded in concrete or otherwise attached in a high cost manner, they are expensive to repair and/or replace.

SUMMARY OF THE INVENTION

The present invention resides in a method for cathodic protection of and/or chloride removal from a reinforced concrete structure. The method comprises the steps of: providing an anode comprising a conductive corrodible metal; providing a corrosive environment for said anode; electrically connecting the anode and the reinforcement of the concrete structure; distributing the current flow from the anode across a surface of the concrete structure; and positioning a humectant at said surface in an effective amount to increase the current flow from the anode.

Electrically connecting the anode and reinforcement of the concrete structure establishes a galvanic cell in which the reinforcement is a cathode. The corrosive environment for the anode increases the anode corrosion rate which in turn increases the potential difference between the reinforcement and the anode.

In an embodiment of the present invention, the anode is positioned at the surface of the concrete structure. A sponge is positioned between the anode and said surface. The humectant is contained within said sponge and is present as a saturated solution in the sponge in corroding contact with the anode.

In a further embodiment, the anode and sponge are contained within an envelope which, at least in part, is impervious to the flow of water, but is pervious to the flow of water vapor.

In another embodiment of the present invention, the anode is positioned at a point remote from the surface of the concrete structure. The anode is immersed in a corrosive environment. A lead connects the anode with a current distributor at the concrete surface. A preferred lead is a salt bridge.

A preferred humectant is calcium chloride.

The present invention also resides in a cathodic protection system which comprises a conductive metal anode on a surface of the concrete, the anode having an interface with the surface. A humectant is present at or near said interface in an effective amount to increase the current delivery from the anode. The anode is sacrificial. The humectant provides a corrosive environment for the anode.

The present invention also resides in a cathodic protection system which comprises a conductive corrodible metal anode positioned at a point remote from the surface of the concrete structure. A corrosive environment is provided for said anode. An electric circuit connects the anode and the reinforcement of the concrete structure. A current distributor positioned on a surface of the concrete structure is electrically connected to the anode. A humectant positioned at the surface is present in an effective amount to increase the current delivery from the current distributor.

A preferred current distributor is a salt bridge.

The present invention also resides in a reinforced concrete structure which comprises the cathodic protection systems of the present invention.

BRIEF DESCRIPTION OF THE DRAWINGS

Further features of the present invention will become apparent to those skilled in the art to which the present invention relates from reading the following specification with reference to the accompanying drawings, in which.

DETAILED DESCRIPTION OF THE INVENTION

Figure 1:
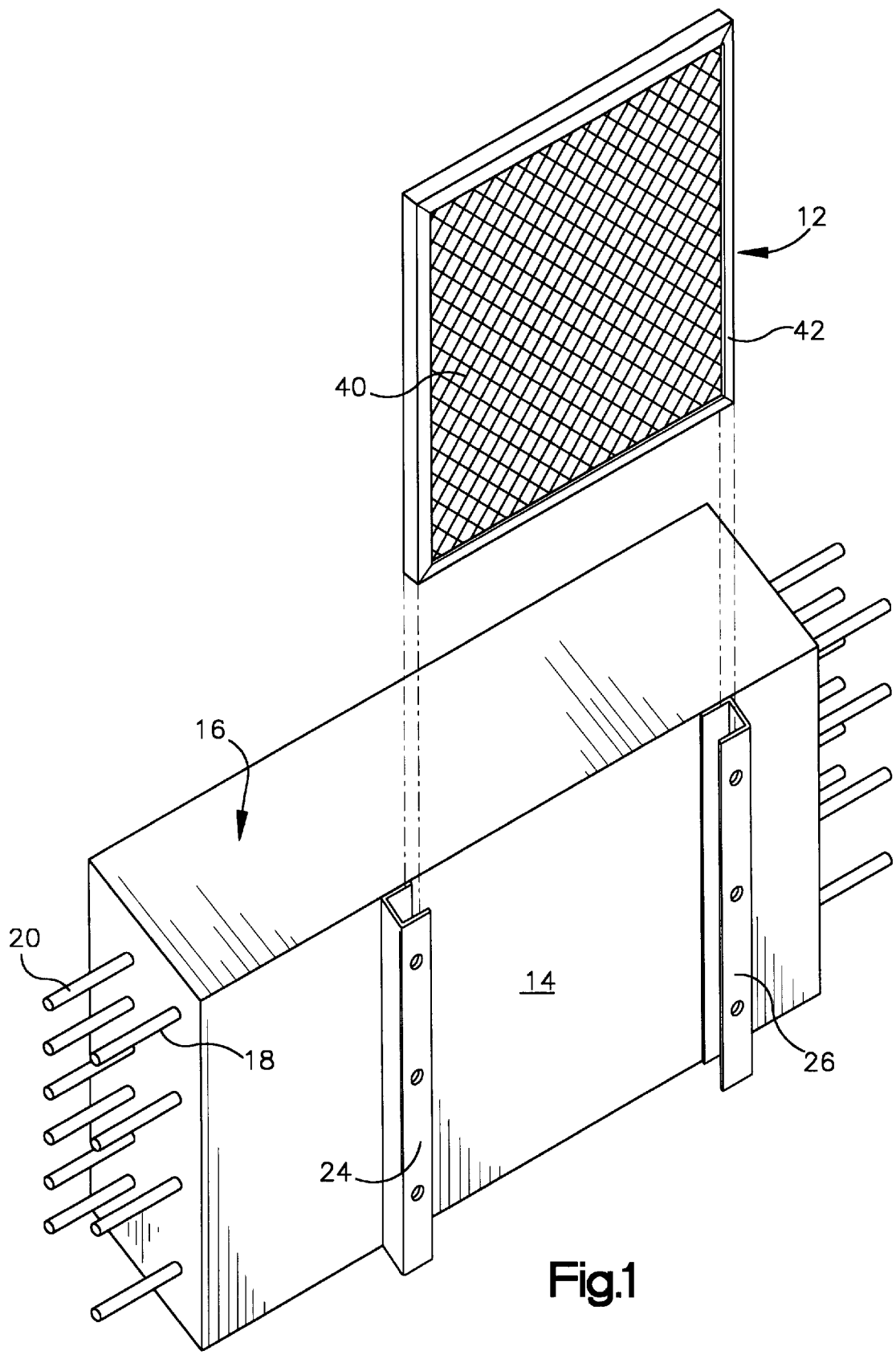
FIG. 1 is an exploded, perspective view of a side of a reinforced concrete structure comprising a cathodic protection system according to the present invention.

Referring to FIG. 1, the cathodic protection system 12, in accordance with the present invention, is applied to a side 14 of a reinforced concrete structure 16. The cathodic protection system 12 is oriented in a vertical plane on the side 14.

It will be understood by those skilled in the art that the cathodic protection system 12 can be applied to the top of a reinforced concrete structure, or in some other position. However, it is an advantage of the present invention that the cathodic protection system 12 provides effective cathodic protection even when applied to a side of a reinforced concrete structure. It is a further advantage of the present invention that the cathodic protection system 12 can even be applied to the underside of a reinforced concrete structure and provide effective cathodic protection.

The reinforced concrete structure 16 comprises two rows 18 and 20 of steel reinforcement. As will be shown, the cathodic protection system 12 of the present invention provides effective cathodic protection for both rows 18 and 20.

In FIG. 1, U-shaped parallel brackets 24 and 26 are secured along the side 14 of the concrete structure 16. The brackets 24 and 26 can be made of an electrically conductive low corrosion rate metal or of a plastic noncorrodible material. The cathodic protection system 12 simply slides into and is held by the brackets 24 and 26 against the side 14.

Figure 2:
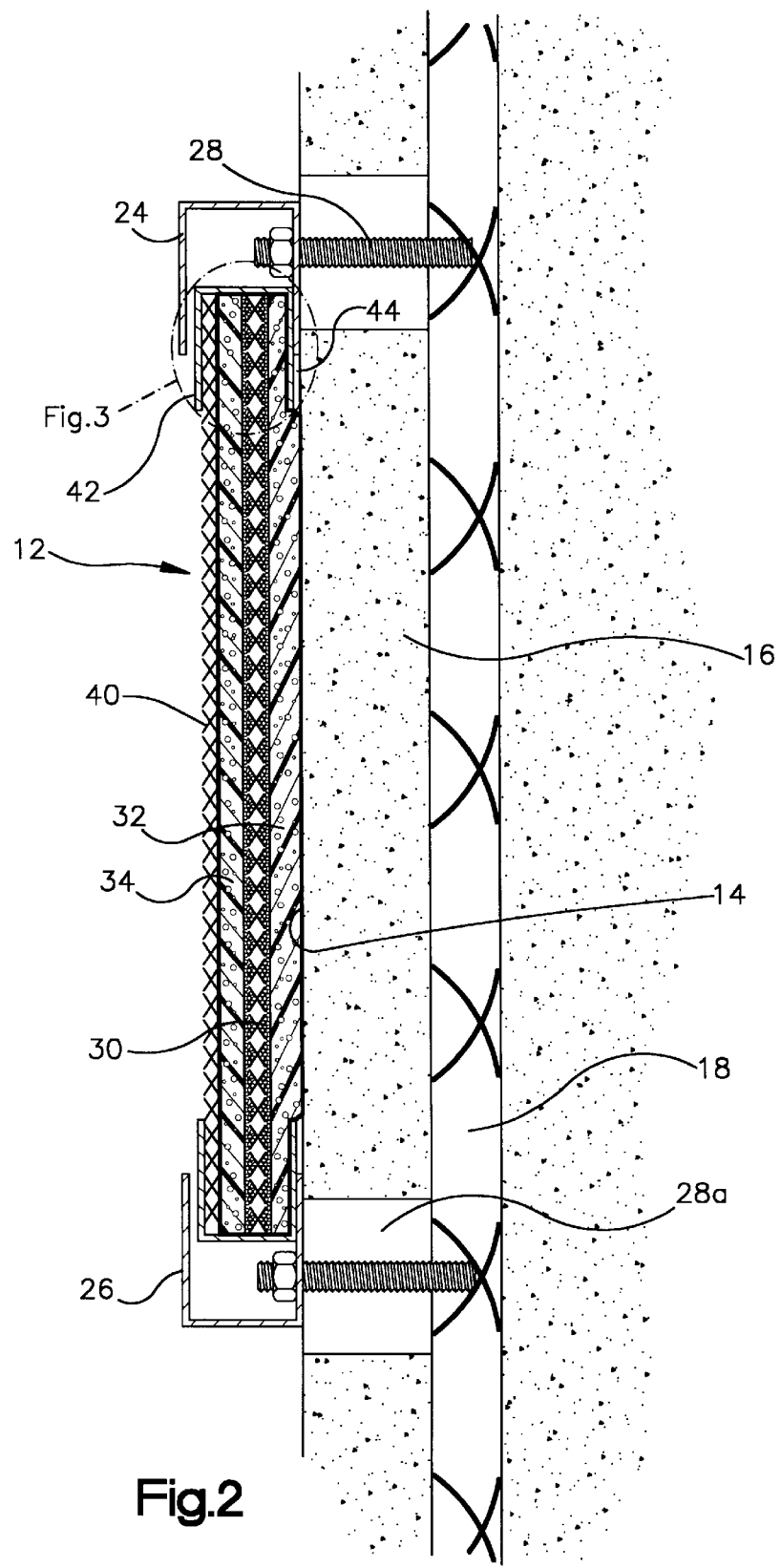
FIG. 2 is an enlarged section view of the cathodic protection system of FIG. 1 positioned on the reinforced concrete structure.

Referring to FIG. 2, the brackets 24 and 26 are secured to the concrete structure 16 by stainless steel bolts 28. Holes 28a are drilled into the concrete structure down to the reinforcement 18 to accommodate the bolts 28. The bolts 28 extend into the holes 28a and are tapped into the reinforcement. The holes are patched with a suitable fill such as a cement, epoxy or asphalt.

Figure 3:
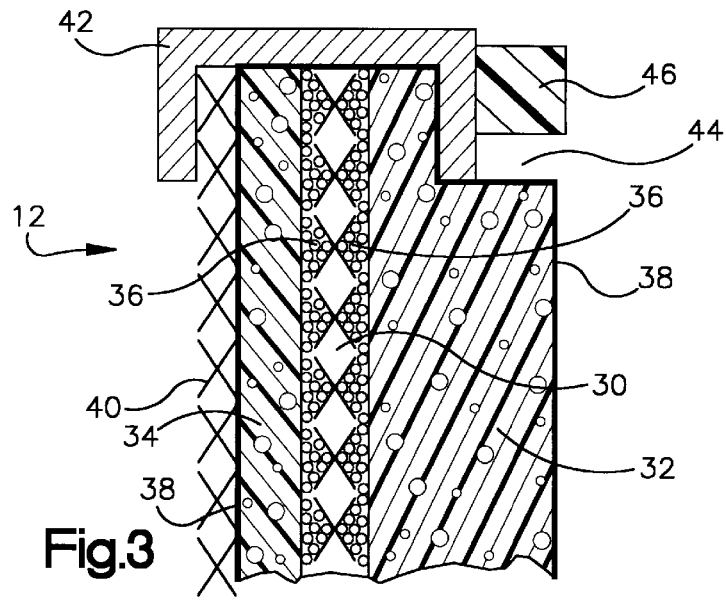
FIG. 3 is an enlarged section view of a portion of the cathodic protection syster of FIG. 2.

FIG. 3 shows details of the cathodic protection system 12 of FIG. 1. The cathodic protection system 12 comprises an anode strip 30. The anode strip 30 is preferably of an expandable metal mesh, although it can also be a continuous metal sheet, or rods, or have any other suitable configuration. The anode strip 30 is made of a metal which is higher in the electromotive series than the iron of reinforcement 18, 20. Thus, when connected in an electrical circuit with the reinforcement, in the absence of an impressed current, a galvanic cell is formed in which the reinforcement constitutes the cathode. The anode becomes sacrificial to the iron of the reinforcement. A preferred material of the anode 30 is zinc, although other sacrificial metals such as aluminum and magnesium can also be used, or combinations of such metals such as a zinc alloy of aluminum.

The anode strip 30 is sandwiched between an inner sponge layer 32 and an outer sponge layer 34. For purposes of the present application, the term "sponge" means any material capable of holding water. A preferred sponge material is an open-cell synthetic sponge manufactured by 3M. A synthetic or natural water absorbent fabric material, such as felt, can also be used.

A humectant or deliquescent material 36 is packed around the anode strip 30. In the embodiment of FIG. 3, it is shown as a granular material. A preferred granular humectant 36 is calcium chloride ($CaCl_2$) in the form of pellets. Other humectants or deliquescent materials can be used, for instance inorganic salts, such as nitrates, nitrites, thiocyanates, thiosulfates, silicates, acetates, formates, and lactates, and sodium hydroxide. Organic humectants or deliquescent materials such as hydrogels can also be used.

The anode strip 30, humectant 36, and inner and outer sponge layers 32 and 34 are encased within a closed envelope 38. The envelope 38 is made of a material which is relatively pervious to the flow of water vapor, but relatively impervious to the flow of liquid water. Such materials are commercially available. A preferred material for the envelope 38 is a water impermeable geotextile fabric marketed by Amoco Fabrics & Fibers Company under the trademark "Style". Nos. 1198 to 2044 were successfully tested.

In operation, the humectant 36 pulls water vapor out of the air at relative humidities of 35% or higher. The envelope 38 allows the water vapor to flow into the inside of the envelope 38, and into the sponge layers 32, 34, but prevents the flow of liquid water in a reverse direction. The accumulation of water vapor in the envelope 38 dissolves the humectant and quickly establishes an equilibrium in which the humectant 36 is entrapped within the sponge layers 32 and 34 as a saturated solution of the humectant. The imperviousness of the envelope 38 to the flow of water holds the saturated solution at the interface between the anode strip 30 and the side 14 of the concrete structure. The envelope 38 also prevents the humectant from being washed away by rain or running water. The cathodic protection system of the present invention can even be immersed in water or positioned underground.

Preferably, for protection from vandalism, the cathodic protection system 12 also includes a second mesh 40, which is on the outer side of the envelope 38. The second mesh 40 may be a corrosion resistant metal or a nonmetallic material (plastic, fiberglass, etc.). The mesh 40 is not exposed to a corrosive environment (of the humectant 36) as anode 30 and thus has a longer life than anode 30.

The edges of the cathodic protection system 12 are encased within a U-shaped corrosion-resistant metal or plastic rim 42. The rim 42 extends around the entire periphery of the system, as shown in FIG. 1. The metal or plastic rim 42 firmly grasps the edges of envelope 38 as shown in FIG. 3.

When the cathodic protection system 12 is inserted into brackets 24 and 26, as shown in FIG. 1, a gap 44 (FIG. 2) exists between the reinforced concrete structure 16 and the metal or plastic rim 42. This gap preferably is sealed with an annular seal 46 (FIG. 3).

Referring to FIG. 2, the anodes 30 and 40 are part of an electric circuit which includes the rim 42 in contact with the anodes and the bolts 28 which extend between the rim 42 and reinforcement. The concrete 16 and sponge layers 32, 34 complete the circuit.

The circuit comprises no source for an impressed current. Current flows from the anode to the cathode from corrosion of the anode, and chloride ions, if present in the area of the reinforcement, flow in the opposite direction. If chloride ions are not present in the area of the reinforcement, the cathodic protection system prevents the penetration of chloride ions into the area of the reinforcement.

It will of course be understood by those skilled in the art that the cathodic protection system 12 can be preassembled with a saturated solution of the humectant 36 already in place, prior to installation of the cathodic protection system 12 onto a concrete structure. In such instances, the humectant would function to draw water vapor out of the air if the cathodic protection system should lose water during a period of low humidity or temperature change. For instance, a solution which is saturated at 120° F. becomes supersaturated at 70° F. resulting in precipitation of humectant. The perviousness of the envelope 38 allows the absorption of more water vapor to revert the system to a saturation equilibrium.

The saturated solution of the humectant 36 serves two functions. Primarily, it functions to provide a constant low resistance or conductive bridge between the anode strip 30 and the reinforced concrete structure 16. Second, being in intimate contact with the anode, it functions as a highly corrosive liquid which aids in the corrosion of the anode and maintains the anode at a peak output voltage for the life of the anode. A saturated solution of calcium chloride is particularly corrosive to such anode materials as zinc, magnesium, aluminum, and combinations thereof.

The advantages of calcium chloride are that calcium chloride is very deliquescent, very corrosive, and remains normally in an unfrozen state.

In the embodiment illustrated in FIGS. 1–3, the amount of humectant preferably is that amount effective to corrode the anode. It is a relatively large amount, for instance about 4,000 to about 8,000 grams per square meter of cathodic protection system. Such a large amount of humectant is capable of causing the absorption in the envelope 38 of a relatively large amount of water. To accommodate this amount of water, the sponge layers 32 and 34 preferably are about $3/8^{th}$ inch to about $1\frac{1}{2}$ inches thick, for instance about $3/4$ inch.

An important aspect of the present invention is having good contact of the sponge layers 32 and 34 with the anode strip 30. This facilitates corrosion of the anode strip 30.

It is also desirable to have a low resistance path between the cathodic protection system 12 and the steel reinforcement 18 and 20 of the reinforced concrete structure 16. To reduce the electrical resistance, a feature of the present invention comprises treating the inner surface 48 of the envelope 38 with a surface wetting agent such as soap. The surface wetting agent allows some seepage of the calcium chloride solution from the sponge layer 32 into the concrete structure. Although the flow of current prevents the transmission of chloride ions to the reinforcement 18 and 20, the presence of the humectant atoms near the interface with the concrete structure maintains a high moisture level at the surface improving the conductivity between the cathodic protection system 12 and the concrete.

It has long been known that lithium ions in the area of the reinforcement, in a reinforced concrete structure, can be beneficial in preventing the gel formation that is experienced due to the presence of certain aggregates and sodium and potassium ions in the area. This gel formation exerts great pressure and deteriorates the concrete. However, it has not heretofore been possible to successfully introduce lithium ions into the area of the reinforcement without an impressed current.

In the present invention, a lithium salt can be packed or otherwise introduced into the cathodic protection system 12 along with the humectant 36. The electric field established between the anode strip 30 and the reinforcement 18, 20, causes the lithium ions to migrate to the reinforcement. This migration occurs because of the high voltage and low resistance made possible by the cathodic protection system 12 of the present invention.

In the embodiment of FIGS. 1–3, the anode strip 30 is made of a rapidly corrodible material, and the anode strip 40 is made of a less corrodible material. Of the metals, magnesium, zinc and aluminum, magnesium corrodes the most rapidly. The anode strip 30 is of magnesium. This produces a large initial voltage difference between the cathodic protection system 12 and the steel reinforcement, when the cathodic protection system is initially installed and activated. This is useful in heavily contaminated reinforced concrete structures, causing chloride ions to migrate rapidly away from the reinforcement. The anode strip 30 is sized to have a relatively short life, being consumed in about three to six months. After consumption of the anode strip 30, the anode strip 40 takes over maintaining a lower but adequate current flow to prevent further corrosion of the reinforcement.

If the anode strip 30 is zinc or aluminum, it will have a much longer life and, being exposed to a corrosive environment, generate a higher current flow during the anode strip life.

Figure 4:
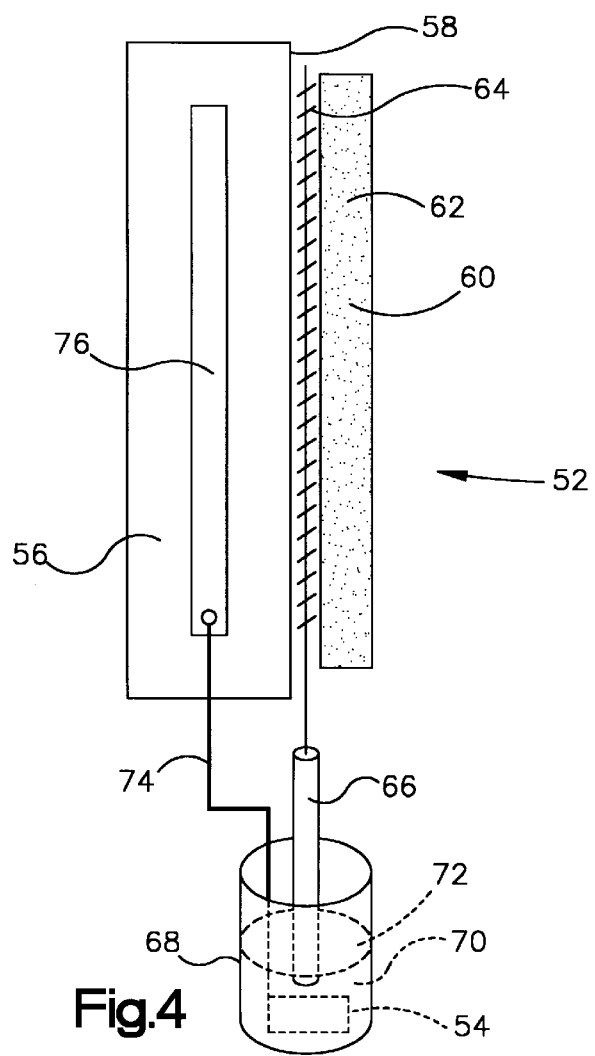
FIG. 4 is a schematic elevation view illustrating an embodiment of the cathodic protection system of the present invention.

In the embodiment of FIG. 4, the cathodic protection system 52 comprises an anode 54 which is remote from the reinforced concrete structure 56. A sponge 60 which is filled with a saturated solution of a humectant 62 is applied to a surface 58 of the structure 56. A metal current distributor 64 is positioned between the sponge 60 and the surface 58. The metal current distributor 64 can be in the form of a rod, a plurality of rods, a strip, a foil or a mesh. The metal of the current distributor 64 is consumed at a low, determinable rate. The metal current distributor 64 has a lead 66 which extends into a container 68. Anode 54 is positioned inside the container 68. The container 68 is filled with a liquid 70 which is conductive and corrosive to the anode 4, and is sealed except for a vent.

A preferred lead 66 is a salt bridge. The salt bridge preferably is a capillary tube that is filled with an ionically conductive fluid and/or solid material. The salt bridge extends into the liquid 70 and connects the anode 54 with the current distributor 64. An electric lead 74 connects the anode 54 directly with the reinforcement 76.

In the operation of this embodiment, the anode 54 is consumed by liquid 70. This causes a large current flow between the reinforcement 76 and current distributor 64, via lead 74 and salt bridge 66, which protects the reinforcement.

An advantage of this embodiment of the present invention is that the anode 54 can be serviced and replaced without accessing that portion of the cathodic protection system physically attached to the concrete structure. This is particularly advantageous where the areas being protected are difficult to reach or access.

If desired, the anode 54 can comprise a first part which is quickly consumed, such as magnesium, to establish an initial high voltage, and a second part which is less easily consumed, such as zinc and aluminum, which establishes a lower voltage. This both facilitates start up of the cathodic protection system and extends the life of the system.

In the embodiment of FIG. 4, the sponge 60 is not encased within an envelope as in the embodiment of FIG. 1. This is useful in a sheltered environment where that portion of the cathodic protection system which is installed on a concrete structure is not exposed to weather or a water flow. An envelope encasing the sponge 60, humectant 62, and current distributor 64 can, however, be employed should exposure to rain or water flow make it desirable.

The following Examples illustrate the present invention.

EXAMPLE 1

Figure 5:
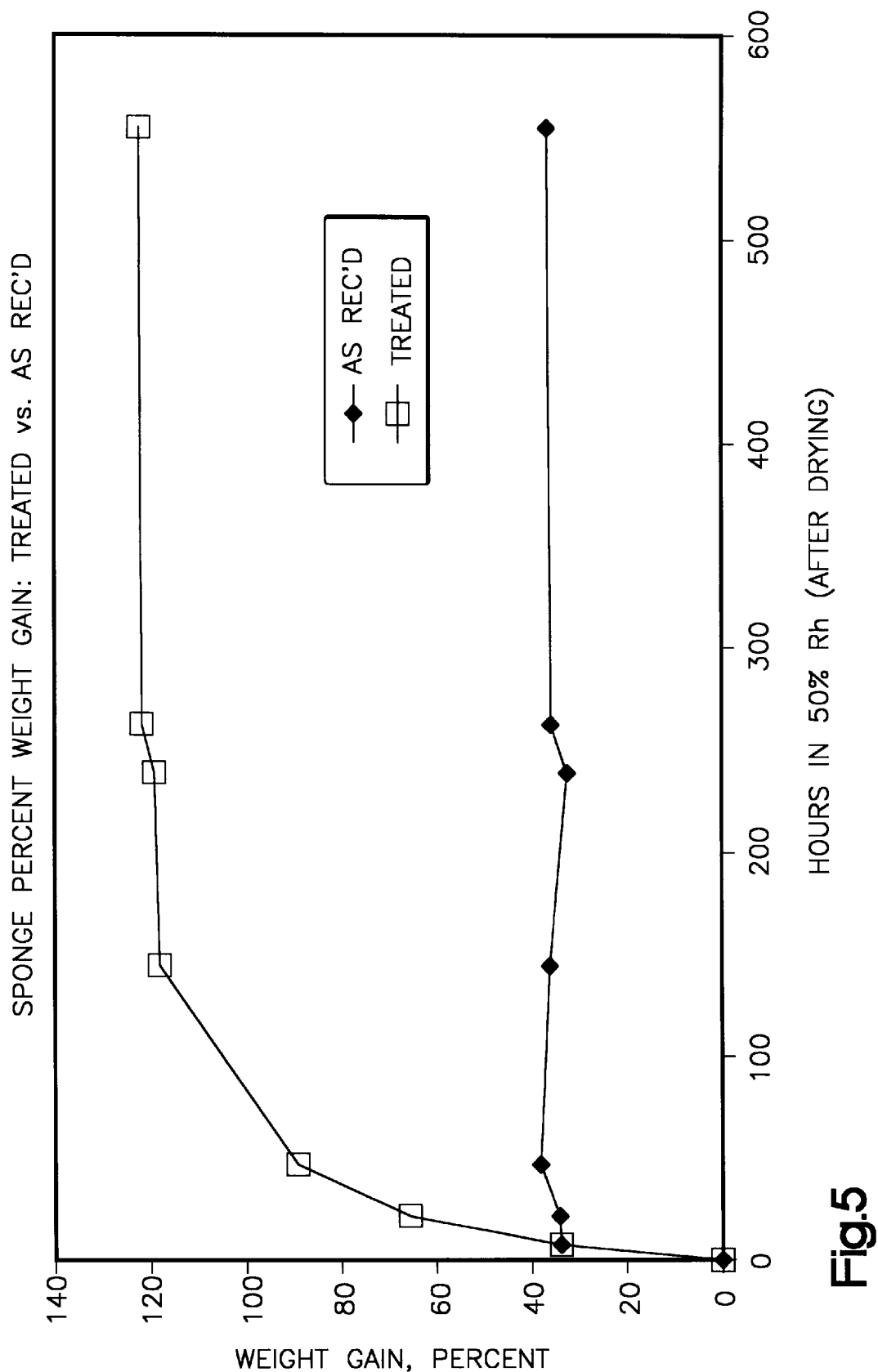
FIG. 5 is a graph showing the water retention capability of a cathodic protection system of the present invention.

Six 4"×4"×1.5" thick cellulose sponges were cut from a single large sponge. Four were treated in accordance with the present invention and two were not. The sponges were oriented vertically. The treated sponges received 4,500 grams per square meter of commercial grade $CaCl_2$ (dry basis), in the form of a saturated solution. All sponges were then dried and then positioned vertically in an enclosed environment at 50% relative humidity (Rh) for 600 hours. FIG. 5 shows the average weight gain in each system throughout the 600-hour period. The treated sponges quickly gained weight until they reached saturation and an equilibrium state at about 150 hours. At saturation, the sponges had a weight gain of about 120%. They remained at this weight gain for the remainder of the 600 hours.

EXAMPLE 2 (CP Mockup 1.XLS)

A mockup was made comprising a cathodic protection system similar to that of FIGS. 2 and 3 except that the system comprised two layers of "Amoco" 1198 fabric between the anode 30 and sponge layer 32 and one layer between the back of sponge layer 34 and mesh 40. The sponge layers were loaded with 2700 grams of a solution consisting of 125% commercial grade calcium chloride by weight of water. The AC resistance in ohms was measured at several points across the system over a 35-day period. The temperature and relative humidity varied from 64 to 71° F. and 18 to 38% Rh, respectively, primarily hovering around 69° F. and 30% Rh. The AC resistance at all points decreased from greater than 1.1 million ohms initial resistance to less than 500 ohms in less than three days, but gradually, however, increased to about 4200–5400 ohms by the end of the period due to the low humidity.

The humidity was then increased to 40 to 50% Rh, resulting in a small decrease in resistance. After four days, the humidity was further increased to 50 to 60% Rh, resulting in a dramatic decrease in resistance to an average of less than 400 ohms.

EXAMPLE 3 (SACP Summary)

Two eight-foot vertically oriented reinforced (prestressed) concrete beams were provided with cathodic protection systems according to the present invention. The beam surface area which was covered comprised 2.667 sq. ft. The reinforcement in each beam comprised 1.308 sq. ft and had 3" of concrete cover. The cathodic protection system on the first beam comprised an aluminum anode and a 1.5 inch sponge between the anode and concrete surface. The cathodic protection system on the second beam comprised a zinc anode and a 1.5 inch sponge between the anode and concrete surface. Each sponge was loaded with a saturated solution of calcium chloride in the amount of 133 weight percent (dry) based on the original weight of the sponge.

The polarization of the reinforcement was measured over a four-month period and is given in the following Table.

TABLE 1

| | Aluminum Anode | | Zinc Anode | |
| --- | --- | --- | --- | --- |
| Days | Current, mA/sq. ft. of steel | Polarization Millivolts mV | Current mA/sq. ft. of steel | Polarization Millivolts mV |
| 16 | −1.01 | −295 | −1.78 | −444 |
| 21 | −2.15 | −351 | −3.62 | −492 |
| About four months | −1.26 | −337 | −2.81 | −459 |

The National Association of Corrosion Engineers (NACE) requires a 100 mV minimum cathodic shift of the steel potential for above ground concrete cathodic protection systems. Existing systems rarely achieve the −100 mV requirement. The above values of about −300 mV or more are significantly higher than the recommended minimum.

Typical steady-state power outputs in existing sacrificial anode CP systems are in the range of −0.1 to −0.6 mA/sq. ft. The above current values of Table 1 are significantly higher than these typical values.

In Table 1, the measurements at day 16 were taken following sixteen days of maintaining the cathodic protection system in a low humidity and temperature environment, at about 25% Rh and in the range of 46 to 64° F., respectively. Initial anode current measurements for the aluminum and zinc systems were −1.90 and −3.81 mA/sq. ft. of steel, respectively.

Between days 16 and 21, the humidity and temperature were increased, measuring 60% Rh and 84° F. on day 21. This resulted in significantly increased current measurements. At four months, the humidity and temperature measurements were 62% Rh and 72° F.

EXAMPLE 4 (SACP Trial No. 1)

A slab of reinforced concrete was tested. The slab was 4'×2'×6" thick and included two spaced apart mats of No. 5 steel reinforcement. The top mat had a square footage of about 5.2 and the bottom mat a square footage of about 7.85.

The slab was covered on its top 4'×2' surface with a cathodic protection system comprising an aluminum anode (Grade Al-5005). The anode was a 56% open expanded mesh weighing 0.56 lb./sq. ft. and having a thickness of $\frac{1}{8}^{th}$ inch. The anode had a width of 20 inches, a length of 47 inches, and surface area of 6.53 sq. ft.

The anode was positioned between two ¾ inch thick open-celled sponges, and the sponges and anode were enclosed in an Amoco 1199 envelope having a double front layer and a single bottom layer. The single layer portion of the envelope positioned against the concrete slab was treated with a wetting agent (a liquid soap) marketed under the trademark "Fantastic" by Dow Brands L. P.

A layer of calcium chloride was placed in the envelope around the anode. The amount of calcium chloride was 2500 grams (4,100 grams per sq. meter=383 grams per sq. ft.). Water was added to the bag in two steps, 2000 grams initially and an additional 3000 grams three days layer.

The anode and both mats of reinforcement were connected in an electric circuit. The average top rebar polarization over the initial one-hour period of measurement ranged between −238 mV and −272 mV. The current density in mA/sq. ft. of concrete varied from −4.74 (@ 1-sec) to −3.67 (@ 1-hr).

The bottom mat of reinforcement was disconnected from the electric circuit. The average top mat polarization was −292 mV and the current density was −3.36 mA/sq. ft. of concrete and −5.14 mA/sq. ft. of top rebar.

It is estimated that the cathodic protection system of this Example would experience an anode consumption rate of about 7.43 lbs. per amp. year, and would have a life of about twelve to fourteen years. Doubling the anode material would double life.

EXAMPLE 5

This Example illustrates the ability of the cathodic protection system of the present invention to function even when positioned on the bottom side of a reinforced concrete structure.

A cathodic protection system similar to that of Example 4 was positioned on the underside of a slab of reinforced concrete similar to that of Example 4. The anode included one 47" long magnesium ribbon placed beneath the aluminum mesh. The polarization of the top steel (i.e., that furthest from the anode) after four hours averaged −104 and the current during the hour varied from −8.85 (@ 1-sec) to −7.63 (@ 1-hr) mA/ft.² of concrete. After three days, the average top mat polarization was −125 mV and the output current was −6.15 mA/sq. ft. of concrete.

EXAMPLE 6

The test of Example 5 was repeated except that the mats were connected via a 1-ohm resistor. A plexiglass strip was placed between the magnesium and aluminum anodes. The average top rebar polarization over six days ranged from −120 to −129 mV. The top reinforcements had a current density of −2.11 to −2.14 mA/sq. ft. of steel. The Federal Highway Administration & American Assoc. of State Hwy & Trans. Officials Standards for a reinforcement mat is numerically (i.e., ignoring the negative sign) greater than −1.5 mA/sq. ft. of steel This Example is particularly important since it shows that the cathodic protection can be placed on the underside of a bridge deck or similar structure and still provide good protection for the upper mat of reinforcement in the deck or other structure which is most susceptible to corrosion (as well as the closer bottom reinforcement).

By positioning the cathodic protection system on the underside of a bridge deck or similar structure, it can be easily serviced and replaced without disrupting traffic flow over the deck or structure.

By providing the cathodic protection system as a unitary member such as shown in FIG. 1, replacement is facilitated, involving no more than removing an in-place member from the holding brackets 24, 26 and inserting a fresh member into the brackets.

By positioning the anode within an envelope, such as item 38 in FIGS. 2 and 3, the anode corrosion products are contained throughout the life of the cathodic protection system and prevented from entering the environment. They can be disposed of safely following removal of the cathodic protection system from a site employing the system.

EXAMPLE 7

The cathodic protection system of Example 4 was modified by positioning two 47" long magnesium ribbons beneath the aluminum mesh. The magnesium ribbons had a surface area of about 1.5 sq. ft., and were connected into the electric circuit which included the two mats of reinforcement. The average polarization over a twenty-hour period was measured and ranged from −420 mV to −611 mV. The current density in mA/sq. ft. of concrete ranged from −11.55 (@1-sec) to −7.08 (@ 20-hrs). This Example illustrates the advantage of a mixed anode system in which one of the anodes is magnesium. Magnesium corrodes at a high rate and creates an initial high polarity. This is useful where the concrete structure, in the area of reinforcement, may be heavily contaminated with chloride ions. The amount of magnesium anode required is only that necessary for migration of chloride ions away from the reinforcement.

The bottom mat of reinforcement was disconnected from the electric circuit. The polarization ranged from −667 to −675 mV., showing the ability of the magnesium anode to reach the upper layer of reinforcement, that area which is likely to be the most contaminated with chloride ions. The current measurement varied between −6.65 and −6.48 mA./sq. ft. of concrete and −9.90 to −10.17 mA/sq. ft. of top rebar.

EXAMPLE 8

The embodiment depicted in FIGS. 1 through 3 was constructed (1-ft by 1-ft), saturated with tap water, installed and activated on a 1-ft by 2-ft, double mat reinforced concrete slab. Initial current output at 73° F. was 12-mA/sq. ft. of concrete surface beneath the anode. After three weeks of operation (without additional wetting) the output at 90° F. was 14.5 mA/sq. ft.

From the above description of the invention, those skilled in the art will perceive improvements, changes and modifications. Such improvements, changes and modifications within the skill of the art are intended to be covered by the appended claims.

Having described the invention, the following is claimed:

1. A sacrificial cathodic protection, chloride removal, and/or realkalization system for a reinforced concrete structure having reinforcement comprising:
    (a) a preformed consumable conductive metal anode contiguous with a surface of said concrete structure;
    (b) an electrical connection between the anode and the reinforcement of the concrete structure wherein the anode and reinforcement form a galvanic cell;
    (c) a solution retention means pervious to the flow of water vapor;
    (d) a solution retained by said solution retention means;
    (e) a water soluble humectant in said solution, said humectant being sufficiently deliquescent that said solution, when exposed to ambient conditions, is a saturated or nearly saturated solution of said humectant, said solution and humectant being corrosive to said anode;
    (f) means positioning said solution retention means whereby said solution is in contact with said anode in an amount effective to increase the corrosion rate and output voltage of the anode.

2. The system of claim 1 wherein the corrosive solution is maintained between the anode and the surface of the concrete structure providing a conductive bridge between the anode and the concrete structure.

3. The system of claim 2 wherein said solution retention means is at least one open-cell sponge or felt layer retaining said solution positioned between the anode and the surface of the concrete structure.

4. The system of claim 3 comprising an envelope containing said sponge or felt layer and the anode, said envelope being impervious to the flow of water but pervious to the flow of water vapor.

5. The system of claim 1 wherein said humectant is calcium chloride.

6. The system of claim 5 wherein said consumable anode is selected from the group consisting of zinc, aluminum, magnesium, and combinations or alloys thereof.

7. The system of claim 1 wherein said solution comprises a lithium salt.

8. The system of claim 1 for concrete structures contaminated with chloride ions comprising at least two consumable anodes of different material, one being magnesium in an effective amount to cause a high rate of migration of chloride ions away from the reinforcement of the concrete structure.

9. A reinforced concrete structure comprising the system of claim 1.

10. A sacrificial cathodic protection system for a reinforced concrete structure having reinforcement comprising:
    (a) an assembly comprising:
        (1) a preformed consumable conductive metal anode of a corrodible metal;

(2) an open cell sponge on a surface of said anode;
(3) an aqueous solution contained by said sponge;
(4) a water soluble humectant in said solution, said humectant being sufficiently deliquescent that said solution, when exposed to ambient conditions, is a saturated or nearly saturated solution of said humectant, said solution and humectant being corrosive to said anode; and
(b) means positioning said assembly on a surface of said structure wherein said sponge is between the anode and said surface and said corrosive solution is present in said sponge and in contact with said anode in an effective amount to increase the corrosion rate of said consumable anode and the output voltage of the anode.

11. The system of claim 10 wherein said humectant is a salt and said system comprises an envelope containing said sponge and anode, said envelope being impervious to the flow of water and pervious to the flow of water vapor, said system further comprising a lead free of an impressed current connecting said anode and the reinforcement of said structure to form a galvanic cell with the reinforcement of said structure.

12. A method for cathodic protection of, chloride removal from and/or realkalization of a reinforced concrete structure having reinforcement comprising the steps of:
(a) providing a preformed consumable anode comprising a conductive corrodible metal contiguous with a surface of the concrete structure;
(b) electrically connecting said anode and the reinforcement of the concrete structure wherein said anode and the reinforcement form a galvanic cell;
(c) distributing the current flow from the anode across a surface of the concrete structure;
(d) providing a solution retention means pervious to the flow of water vapor;
(e) positioning a solution in said solution retention means, said solution comprising a humectant which is sufficiently deliquescent such that said solution, when exposed to ambient conditions, is a saturated or nearly saturated solution of said humectant, said solution and humectant being corrosive to said anode; and
(f) positioning said solution retention means whereby said solution is in contact with said anode in an amount effective to increase the corrosion rate and output voltage of the anode.

13. The method of claim 12 wherein said solution retention means is an open-cell sponge or felt, and the electrical connection of step (b) is free of an impressed current, said humectant being a water soluble salt.

14. The method of claim 13 comprising encasing said sponge or felt and anode within an envelope impervious to the flow of water but pervious to the flow of water vapor.

15. The method of claim 14 wherein said solution is a saturated or nearly saturated solution of calcium chloride.

16. The method of claim 15 wherein said anode is a corrodible metal selected from the group consisting of zinc, aluminum, magnesium, and combinations or alloys thereof.

17. The method of claim 12 for concrete structures contaminated with chloride ions comprising providing at least two consumable anodes of different materials, one being magnesium, in an effective amount to cause a high rate of migration of chloride ions away from the reinforcement of the concrete structure.

18. The method of claim 12 wherein said solution comprises a lithium salt.

19. A sacrificial cathodic protection, chloride removal, and/or realkalization system for a reinforced concrete structure having reinforcement comprising:

(a) a consumable conductive metal anode remote from said reinforced concrete structure;
(b) a liquid which is corrosive to said anode in corroding contact with said anode;
(c) a current distributor at a surface of the concrete structure; and
(d) a circuit connecting the current distributor, the anode and the reinforcement of the concrete structure to form a galvanic cell;
said aqueous solution liquid increasing the corrosion rate and output voltage of the anode.

20. The system of claim 19 wherein said anode is immersed in said corrosive liquid, further comprising a lead from the anode to the current distributor, said lead comprising a salt bridge, said salt bridge comprising said liquid.

21. The system of claim 20 further comprising an open-cell sponge positioned adjust the current distributor and said surface of the reinforced concrete structure, a salt contained within the sponge in the form of a saturated or nearly saturated solution, said salt being a humectant, and an envelope pervious to the flow of water vapor but impervious to the flow of water containing said current distributor and the sponge.

22. The system of claim 21 wherein said liquid corrosive to the anode comprises calcium chloride.

23. The system of claim 22 wherein said anode is a metal selected from the group consisting of corrodible zinc, aluminum, magnesium, and combinations or alloys thereof.

24. The system of claim 21 wherein said solution contained by said sponge comprises a lithium salt.

25. The system of claim 19 for concrete structures contaminated with chloride ions comprising at least two consumable anodes of different materials, one being magnesium in an effective amount to cause a high rate of migration of chloride ions away from the reinforcement of the concrete structure.

26. A reinforced concrete structure comprising the cathodic protection system of claim 19.

27. The system of claim 19 free of an impressed current.

28. A sacrificial cathodic protection system for a reinforced concrete structure having reinforcement comprising:
(a) an assembly comprising:
(1) a current distributor;
(2) an open cell sponge in contact with said current distributor;
(3) a salt contained by said sponge in the form of a saturated or nearly saturated solution, said salt being a humectant;
(4) an envelope pervious to the flow of water vapor and impervious to the flow of water containing said sponge and the current distributor;
(b) means for positioning said assembly on a surface of said structure wherein said sponge is adjust the current distributor and said surface;
(c) a consumable anode of a corrodible metal remote from said reinforced concrete structure;
(d) a liquid corrosive to said anode in corroding contact with said anode increasing the corrosion rate and output voltage of the anode;
(e) a first lead connecting said anode and said current distributor, said anode being immersed in said liquid of paragraph (d) and said lead comprising a salt bridge wherein said salt bridge comprises the liquid of paragraph (d); and
(f) a second lead connecting said anode and the reinforcement of said concrete structure, wherein said leads, said anode, said reinforcement, and said current distributor form a galvanic cell in which the reinforcement is a cathode in said cell.

29. A method for cathodic protection of, chloride removal from, and/or realkalization of a reinforced concrete structure having reinforcement comprising the steps of:
(a) providing a consumable anode of a conductive corrodible metal, wherein said anode is remote from the reinforced concrete structure;
(b) providing a liquid in corroding contact with said anode in an effective amount to increase the corrosion rate and output voltage of the anode;
(c) providing a current distributor at a surface of the concrete structure; and
(d) connecting the current distributor, the anode and the reinforcement of the concrete structure to form a galvanic cell.

30. The method of claim 29 wherein said anode is immersed in said liquid and said liquid ionically connects said anode and the current distributor.

31. The method of claim 30 comprising the step of positioning an open-cell sponge adjust the current distributor and the surface of the concrete structure, positioning in said sponge a saturated or nearly saturated solution of a salt, said salt being a humectant, and encasing said current distributor and the sponge in an envelope pervious to the flow of water vapor but impervious to the flow of water.

32. The method of claim 31 wherein said anode is a corrodible metal selected from the group consisting of zinc, aluminum, magnesium, and combinations or alloys thereof.

33. The method of claim 32 for concrete structures contaminated with chloride ions comprising providing at least two consumable anodes of different materials, one being magnesium, in an effective amount to cause a high rate of migration of chloride ions away from the reinforcement of the concrete structure.

34. The method of claim 31 wherein said solution contained by said sponge comprises a lithium salt.

\* \* \* \* \*